(12) United States Patent
Rajan et al.

(10) Patent No.: US 8,577,930 B2
(45) Date of Patent: Nov. 5, 2013

(54) MEASURING TOPICAL COHERENCE OF KEYWORD SETS

(75) Inventors: Suju Rajan, Sunnyvale, CA (US); Scott J. Gaffney, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1446 days.

(21) Appl. No.: 12/195,068

(22) Filed: Aug. 20, 2008

(65) Prior Publication Data

US 2010/0049504 A1    Feb. 25, 2010

(51) Int. Cl.
     *G06F 17/30*      (2006.01)
(52) U.S. Cl.
     CPC ................................. *G06F 17/30017* (2013.01)
     USPC ........................................................ 707/804
(58) Field of Classification Search
     USPC ................. 707/713, 765, 766, 769, 770, 804;
                                    709/224, 225, 226; 711/150
     See application file for complete search history.

(56) References Cited

U.S. PATENT DOCUMENTS

| | | | |
|---|---|---|---|
| 6,289,337 B1 | 9/2001 | Davies et al. | |
| 6,546,388 B1 | 4/2003 | Edlund et al. | |
| 6,567,936 B1 | 5/2003 | Yang et al. | |
| 6,636,848 B1 * | 10/2003 | Aridor et al. | 707/728 |
| 7,324,990 B2 | 1/2008 | Jaschek et al. | |
| 7,392,250 B1 | 6/2008 | Dash et al. | |
| 7,412,442 B1 | 8/2008 | Vadon et al. | |
| 7,577,652 B1 | 8/2009 | Rajan et al. | |
| 2002/0103698 A1 | 8/2002 | Cantrell | |
| 2005/0027666 A1 | 2/2005 | Beck, Jr. et al. | |
| 2005/0114348 A1 | 5/2005 | Wesinger, Jr. et al. | |
| 2006/0010105 A1 | 1/2006 | Sarukkai et al. | |
| 2006/0015401 A1 | 1/2006 | Chu et al. | |
| 2006/0074910 A1 | 4/2006 | Yun et al. | |
| 2006/0117228 A1 * | 6/2006 | Theimer et al. | 714/45 |
| 2006/0242017 A1 | 10/2006 | Libes et al. | |
| 2006/0288100 A1 | 12/2006 | Carson et al. | |
| 2007/0067267 A1 | 3/2007 | Ives | |
| 2007/0073669 A1 | 3/2007 | Kraft | |
| 2007/0100811 A1 | 5/2007 | Errol et al. | |
| 2007/0106747 A1 | 5/2007 | Singh et al. | |
| 2007/0168354 A1 | 7/2007 | Ramer et al. | |
| 2007/0271370 A1 | 11/2007 | Kehl | |
| 2007/0282785 A1 | 12/2007 | Fayyad et al. | |
| 2008/0133477 A1 | 6/2008 | Patel | |

FOREIGN PATENT DOCUMENTS

| | | |
|---|---|---|
| WO | WO 2006062421 | 6/2006 |
| WO | WO 2006133462 | 12/2006 |
| WO | WO 2008087728 | 7/2008 |

OTHER PUBLICATIONS

Joshi et al., Keyword generation for search engine advertising, 2006, IEEE, 490-496.*

Huang et al., "Query Expansion Using Topic and Location", Oct. 28-31, 2007, IEEE, 619-624.

(Continued)

*Primary Examiner* — Jean B Fleurantin
(74) *Attorney, Agent, or Firm* — Weaver Austin Villeneuve & Sampson LLP (57) ABSTRACT

Methods and apparatus are described for measuring the topical coherence of a keyword set while simultaneously partitioning the set into contextually related clusters.

20 Claims, 4 Drawing Sheets

(56) References Cited

OTHER PUBLICATIONS

Hoyeon Ryu et al., "n-Keyword based Automatic Query Generation", Nov. 9-11, 20006, IEEE, vol. 2, 90-96.

F. Biel, et al., "Frequent Term-Based Text Clustering," Abstract, 7 pages.

B. Fung, et al., "Hierarchical Document Clustering Using Frequent Itemsets," Abstract, 12 pages.

Vibhanshu Abhishek, "Keyword Generation for Search Engine Advertising using Semantic Similarity between Terms", 16$^{th}$ International World Wide Web Conference, Banff, Alberta, Canada, May 8-12, 2007, http://www2007.org/workshops/paper_87.pdf, May 8, 2007.

Antonellis et al., "Simrank++: Query Rewriting through Link Analysis of the Click Graph Poster", World Wide Web 2008, Poster Paper, Apr. 21-25, 2008, Beijing, China.

Ganchev et al., "Empirical Price Modeling for Sponsored Search", World Wide Web 2007, May 8-12, 2007, Banff, Canada.

Jansen, "Adversarial Information Retrieval Aspects of Sponsored Search", College of Information Sciences and Technology, The Pennsylvania State University.

Sculley, "Rank Aggregation for Similar Items", Tufts University, Medford, MA, 2006, pp. 587-592.

US Notice of Allowance dated Jul. 6, 2009 from U.S. Appl. No. 12/236,108.

* cited by examiner

MEASURING TOPICAL COHERENCE OF KEYWORD SETS

BACKGROUND OF THE INVENTION

The present invention relates to techniques for measuring the similarity among words and phrases and, in particular to techniques for generating a measure of the similarity within a keyword set for use in sponsored search advertising.

Sponsored search is an important source of revenue for providers of search services on the Web. Advertisers bid on keywords (i.e., specific words and phrases) and when those keywords are entered by users as queries into a search engine, advertisements provided by the advertisers (i.e., sponsored search results) are shown in conjunction with a list of documents and/or web pages responsive to the keywords (i.e., organic search results).

Conventionally, the keyword set for a particular advertiser is created manually by the advertiser, often according to what makes sense to individual representatives of the advertisers, possibly but not necessarily referring to some form of market research. Sometimes there might be some level of similarity among the keywords, but often the various keywords in the set might map to many different ideas and concepts.

More recently, the introduction of the notion of an ad group, i.e., an association of a particular advertisement or "creative" with a particular set of keywords, has made keyword sets that map to many concepts disadvantageous. That is, if a topically focused advertisement is invoked by the keywords in a keyword set, the advertisement is likely to be more successful to the extent that it represents the keyword(s) by which it is invoked. However, the relationship among the keywords in a keyword set relative to a particular concept are typically only evaluated in a manual and ad hoc manner.

SUMMARY OF THE INVENTION

According to the present invention, techniques are provided for measuring the topical coherence of a set of text strings such as, for example, a set of keywords. According to one class of embodiments, methods and apparatus are provided for representing topical similarity among a plurality of text strings in a text string set. The text string set is expanded using search results generated in response to at least one search query including the plurality of text strings thereby resulting in an expanded text string set. Frequent itemsets in the expanded text string set are identified. A vocabulary is developed for the text string set including selected ones of the frequent itemsets. A similarity measure is calculated for each pair of the selected frequent itemsets in the vocabulary. A topical coherence measure is generated for the text string set with reference to the similarity measures.

According to another class of embodiments, methods and apparatus are provided for representing topical similarity among keywords in a keyword set for use in a sponsored search advertising campaign. The keyword set is expanded using search results generated in response to at least one search query including the plurality of keywords thereby resulting in an expanded keyword set. Frequent itemsets and outlier text strings are identified in the expanded keyword set using a clustering technique. A vocabulary is developed for the keyword set with reference to each itemset having a support level above a threshold. The vocabulary includes selected ones of the frequent itemsets. A similarity measure is calculated for each pair of the selected frequent itemsets in the vocabulary. A topical coherence measure is generated for the keyword set with reference to the similarity measures.

According to yet another class of embodiments, methods and apparatus are provided for sponsored search advertising. A plurality of sponsored search advertisements is identified in response to a search query from a user. Each of the sponsored search advertisements has a keyword set associated therewith. Each of the plurality of sponsored search advertisements is ranked with reference to a topical coherence measure for the associated keyword set. The topical coherence measure represents a topical similarity among keywords in the keyword set. The sponsored search advertisements are transmitted for presentation to the user in accordance with the ranking.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Various embodiments of the present invention provide techniques by which the "topical coherence" of a set of text strings, e.g., keywords, may be measured. As used herein, "topical coherence" refers to a measure of how well the text strings in a set represent one or more concepts or topics. For example, if all the text strings in a set map strongly to one concept the set will have a high measure of topical coherence. It should be noted, however, that a significant measure of topical coherence may still exist even where the text strings of a set map to multiple topics. Such might be the case, for example, where most or all of the text strings in the set strongly map to one of a small number of topics. Put another way, topical coherence relates to how well defined within the set are the one or more topics to which the text strings map.

For the remainder of this description the term "keyword" will be used instead of "text string." This is due to the fact that at least some of the example embodiments discussed below relate to the context of sponsored search advertising in which advertising keywords play an important role. However, the use of the term "keyword" should not be construed as limiting the invention to that context. Rather, the term keyword should be construed as broadly as "text string" when evaluating the scope of the present invention.

In addition to generating a measure of topical coherence, embodiments of the invention also enable the discovery of multiple different topics within a keyword set. That is, according to such embodiments, various topics, concepts, or ideas to which the keywords map are discovered during the process of developing a vocabulary for the whole keyword set. Such information might be useful, for example, in the context of sponsored search advertising in that the topics discovered within the larger keyword set and the subset of keywords mapping to those topics might represent potential new keyword sets with a higher level of topical coherence than the larger keyword set of which they are a part.

Specific embodiments are discussed below providing specific numerical representations of topical coherence. It will be understood that these are merely illustrative examples, and that a wide variety of representations of the notion of topical coherence are contemplated. It will also be understood that, as mentioned above, the present invention is not limited to measuring the topical coherence of advertising keyword sets. Rather, the techniques described herein may be used to generate a measure of topical coherence for any set of text strings.

Figure 1:
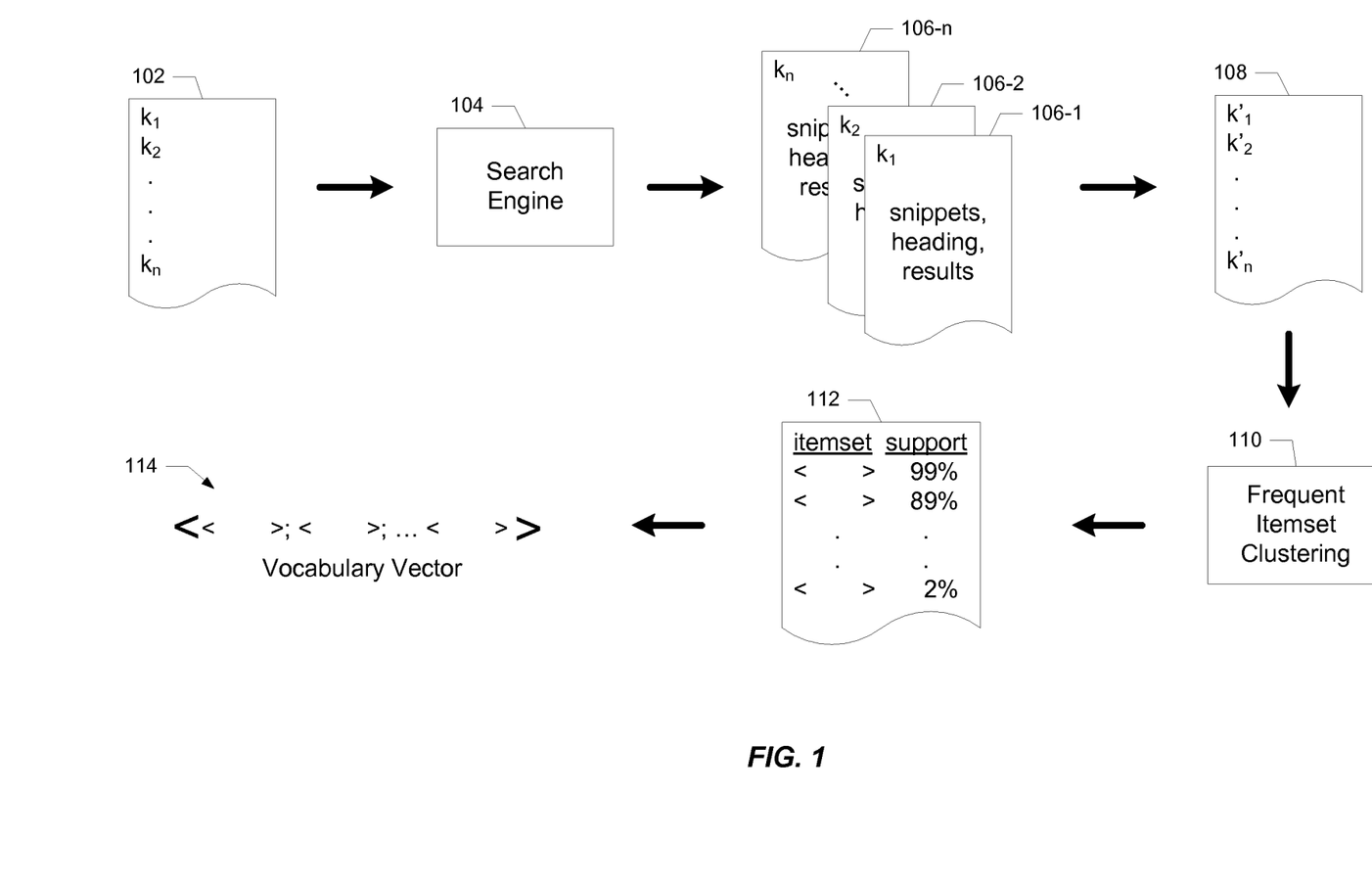
FIG. 1 is a simplified block diagram illustrating operation of a specific embodiment of the invention.
Figure 2:
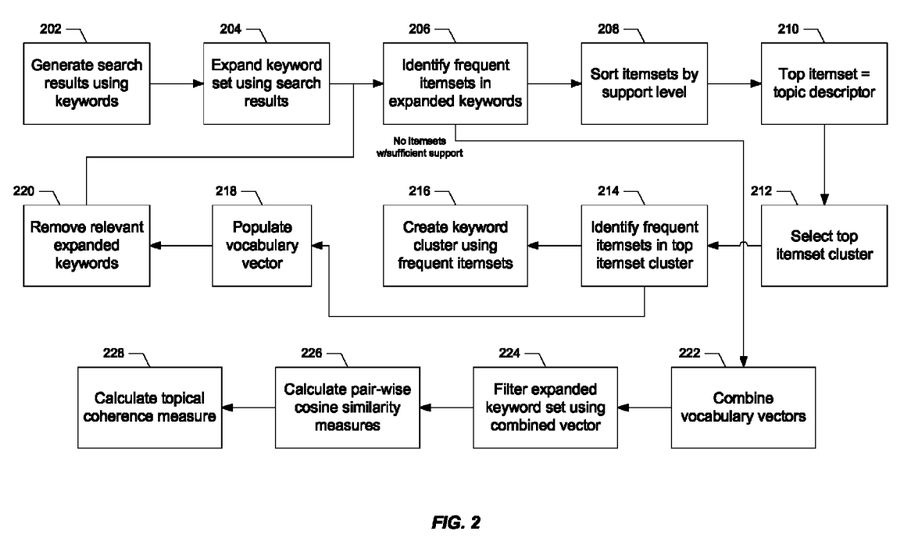
FIG. 2 is a flowchart illustrating operation of the embodiment of FIG. 1.

A particular embodiment of the invention will now be described with reference to the block diagram of FIG. 1 and the flowchart of FIG. 2. In this example, the initial input is a set of keywords 102 which includes keywords $k_1$ through $k_n$, each of which is a text string which may include one or more words. As discussed above, these keywords may be advertising keywords on which an advertiser in the sponsored search context has bid. However, also as discussed above, the invention is not so limited.

As will be discussed below, the embodiment illustrated in FIGS. 1 and 2 employs a frequent-itemset-based clustering technique of the kind which has been conventionally used to cluster large document sets. Given that the typical keyword set is a relatively sparse data set (i.e., individual keywords do not provide as much information as a document, and a keyword set is generally smaller than the typical document set), the initial keyword set 102 is expanded. According to one embodiment, the expansion is achieved in the following manner.

Each of the keywords in keyword set 102 is entered as a query into a search API 104 such as, for example, the search API provided by Yahoo! Inc. of Sunnyvale, Calif. (202). This generates a set of search results 106-1 through 106-$n$ for each of keywords $k_1$ through $k_n$, respectively (e.g., using exact match and/or partial match). Content derived from each set of search results 106 (which may resemble a conventional set of search results) is then used to "expand" the corresponding keyword (204) resulting in expanded keyword set 108 which includes expanded keywords $k'_1$ through $k'_n$.

According to a specific embodiment, the content included in the top few (e.g., top 5) search results of each set 106 is used for this expansion. According to one embodiment, one result per domain for some number (e.g., 5) of unique domains is used. The assumption underlying such an approach is that there is a higher level of confidence in the representative nature of the content if the same concept is represented in independent domains.

The content used for expansion might include, for example, a heading or document title, snippets from the document or page to which the result refers, etc. The expansion may also involve selection or filtering of the content. This may require, for example, the removal of various types of "noise" from the content which will not add to coherency. This may involve, for example, stemming and/or the removal of stop words, e.g., conjunctions, articles, prepositions, etc. In addition, the content may be filtered by frequency of occurrence, e.g., only words occurring more than twice (e.g., within a snippet, in two or more snippets, etc.) are included in the expansions. Other types of noise may also be filtered, e.g., ignoring frequently occurring domain names. As will be understood, a wide variety of filtering, selection, and/or noise removal techniques may be employed to derive relevant information from this content for the expansion of the corresponding keywords.

A frequent-itemset-based clustering technique 110 is employed to identify each itemset, i.e., word or combination of words, in expanded keyword set 108 and its associated support level, e.g., the percentage of expanded keywords in which each itemset occurs (112, 206). Information about suitable clustering techniques for use with embodiments of the invention are described in *Frequent Term Based Text Clustering*, F. Beil, M. Ester, and X. Xu, In Proc. Of SIGKDD (2002) and *Hierarchical Document Clustering using Frequent Itemsets*, B. C. M. Fung, K. Wang, and M. Ester, In Proc. Of SDM (2003), both of which are incorporated herein in their entireties for all purposes.

Important itemsets in 112 (i.e., itemsets having some minimal support level, e.g., at least 2%) are sorted by support level (208) and the itemset having the highest level of support is designated as a topic descriptor (210). Each itemset in 112 represents a cluster of expanded keywords which include that itemset (and therefore a cluster of the corresponding keywords from the original data set). The cluster of expanded keywords for the first itemset in 112 is selected (212). Frequent itemsets with high support levels (e.g., >75%) are identified for the selected cluster (214). The identified frequent itemsets are used to create a keyword cluster (216) and populate a vocabulary vector 114 (218). The expanded keywords corresponding to the itemsets used to populate the vocabulary vector are then removed from expanded keyword set (220), and the process iterated until there are no itemsets identified as having at least some minimal level of support.

In addition to automatically identifying topically coherent subsets of keywords (along with an associated topic descriptor) within the original keyword set, the process also automatically identifies keywords that are outliers, e.g., keywords which do not include any frequent itemsets. The union of the vocabulary vectors for each iteration (222) becomes the vocabulary of the original keyword set.

According to some embodiments, the level of support required to continue iterating may vary depending on the particular application as well as other parameters such as, for example, the manner in which the support level for successive iterations changes. For example, if there is a particularly precipitous drop-off in support as between the itemsets associated with successive iterations, e.g., 65% to 15%, this might be an indication that it is time to stop the process. On the other hand, if the change in support level is more gradual, e.g., in increments of 2-5%, iterations might be continued to include itemsets having relatively low support, e.g., 2%. The size of the initial keyword set (102) can also be used as a guide to set appropriate support levels.

Embodiments of the invention may be advantageous in view of the fact that the general approach described herein lends itself to automated implementations. That is, given a set of text strings, embodiments of the present invention may be used to divide the initial set into multiple sets or clusters each having relatively high topical coherence with little or no human input. In addition, embodiments of the invention automatically expand a set of keywords to obtain better clusters. And unlike many automated techniques, some embodiments of the invention do not need labeled training data. Nor are some embodiments limited by factors such as the granularity of the classification space. In addition, some embodiments of the invention have no data-dependent parameters, thus avoiding the situation, for example, in which the algorithm has to be constantly tweaked to reflect changes in the vocabulary of the clusters or keyword sets. In addition, embodiments of the invention do not require domain knowledge to produce reasonable results. This is to be contrasted with "k-means" like approaches that require the user to have an intelligent estimate of the number of clusters.

According to a particular class of embodiments, a measure of the topical coherence for the original keyword set is derived with reference to the vocabulary which is the union of the vocabulary vectors generated in the successive iterations of the process described above. This combined vocabulary is imposed (i.e., applied as a filter) on the expanded keyword set to remove any words not included in the vocabulary vector (224). A similarity measure is then determined between each pair of filtered expanded keywords (226). These values are then summed and divided by the total number of pair-wise similarity measures to generate an average similarity measure (228) which is a representation of the topical coherence of the original keyword set 102. According to a specific embodiment, the similarity measures represent pair-wise cosine measures. However, it will be understood that any of a wide variety of similarity measures may be employed with various embodiments of the invention.

Depending on the particular implementation of the invention, a variety of advantages may be realized from the ability to measure the topical coherence of a set of keywords. For example, an advertiser could use such information to modify a keyword set for a particular ad group (e.g., by removing outliers or including terms identified in the expansion) to ensure that the keywords in the set better map to a particular topic, concept, or idea to which the ad group is directed. This is based on the notion that the more clearly a sponsored search result represents or correlates with the concept to which a user's search query is directed, the more effective that sponsored search result is likely to be (at least in terms of click through rate).

In another example, the topical coherence of a particular keyword set may be used by the provider of search services to rank and place sponsored search results on a search results page. Again, this is based on the assumption that the higher the topical coherence of the keyword set, the more likely the user will interact with the corresponding creative, i.e., in this case the sponsored link associated with the keyword set.

In yet another example, the provider of search services could divide an advertiser's keywords into multiple keyword sets (or suggest such a division to the advertiser) using the clusters and their descriptors identified as described above.

In the context of sponsored search advertising, there are a variety of metrics which form the economic underpinnings of the basic model. One such metric is click-through rate or CTR which measures the extent to which users actually click on or select a given advertisement. However, at the end of the day, what matters most to both advertisers and providers of advertising space are conversions, i.e., completed transactions however defined. But, this can be a relatively difficult thing to measure. As a result, metrics such as CTR are used as imperfect representations of ad quality based on the fact that they are easy to measure and track. Unfortunately, how well an advertisement matches query terms (a good predictor of CTR) may have little or nothing to do with how well the landing page corresponding to the advertisement meets the needs of the user (which correlates highly with conversions).

Therefore, according to a class of embodiments of the invention, techniques are provided to evaluate the quality of an advertisement relative to the likelihood of conversion. An example of a specific implementation will be described with reference to FIG. 3. When a user is presented with a search results page 302 in response to a query 304, sponsored search advertisements 306-310 are also presented. As discussed above, the extent to which an ad matches the user's query is highly predictive of whether the user will actually click on the ad. However, it is the landing page 312 presented in response to that click, i.e., the extent to which the landing page serves the user's purpose or matches the user's intent, which determines whether a conversion event will occur. Therefore, techniques enabled by the present disclosure are adapted to evaluate how well an ad landing page (e.g., 312) matches the keyword set associated with the corresponding advertisement (e.g., 308). Stated another way, embodiments of the present invention may be employed to represent the topical coherence of the components of an ad group, e.g., the advertiser's keyword set and the landing page(s) (and possibly the advertisement as well).

Figure 3:
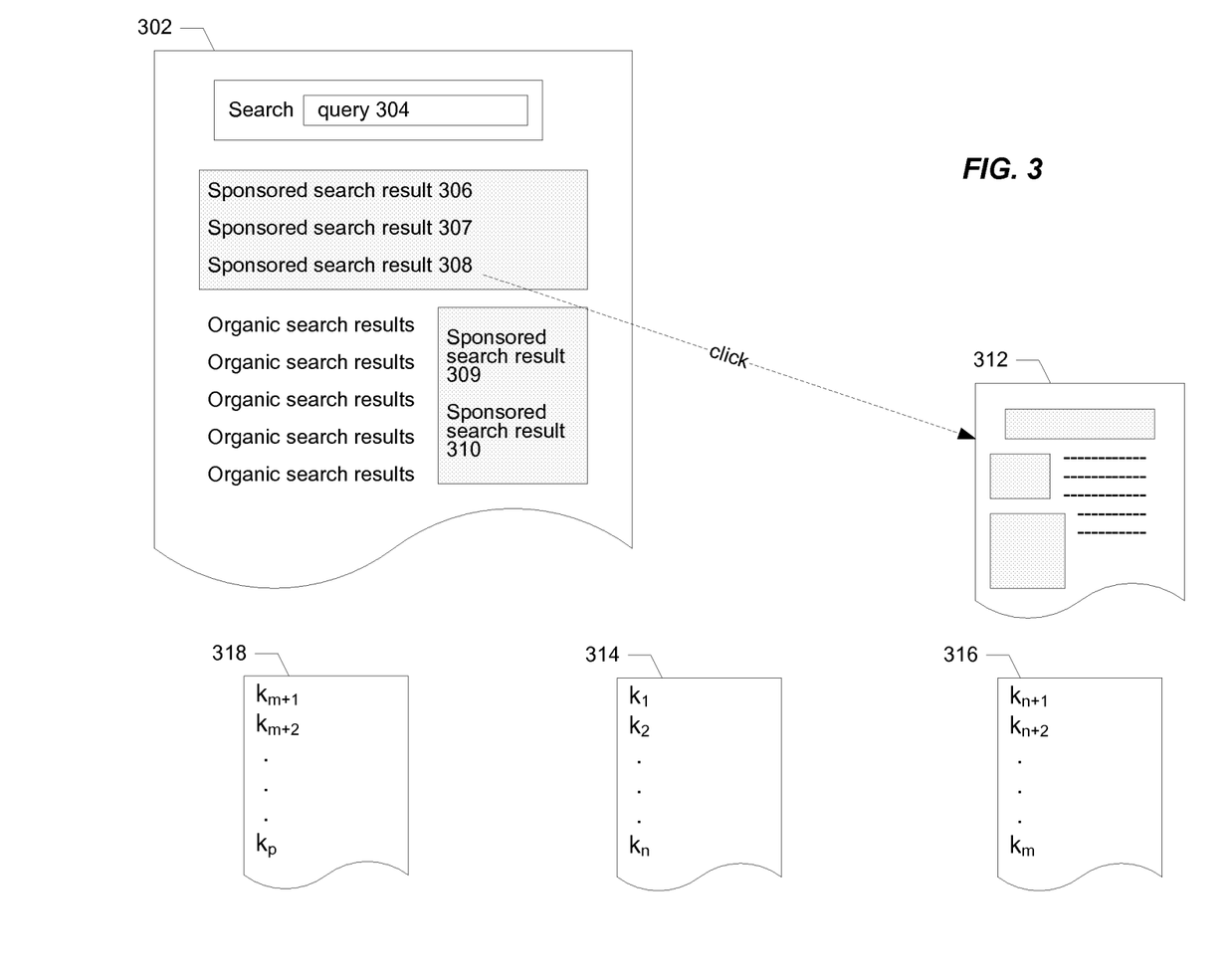
FIG. 3 is a block diagram illustrating operation of another specific embodiment of the invention.

According to one approach, each component of the ad group is represented as a keyword set which may then be combined and processed as described above. Obviously, the keyword set (e.g., 314) associated with the ad group is already in a suitable form. The landing page (e.g., 312) may be converted into a keyword set (e.g., 316) through evaluation of the content and purpose of the landing page. This might include, for example, extraction of relevant keywords from page text, reference to metadata associated with the page, classification of the page type or purpose, etc. This may be done using automated or manual techniques, or combinations thereof. Similarly, any advertisements associated with the ad group (e.g., 308) may be represented with a keyword set (e.g., 318), although embodiments are contemplated in which the topical coherence of an ad group is evaluated only with respect to the keyword set and the landing page(s). Once the ad group is represented by a set of keywords, a measure of the topical coherence of the keyword set, and therefore a representation of the quality of the ad group, may be generated as described herein.

Figure 4:
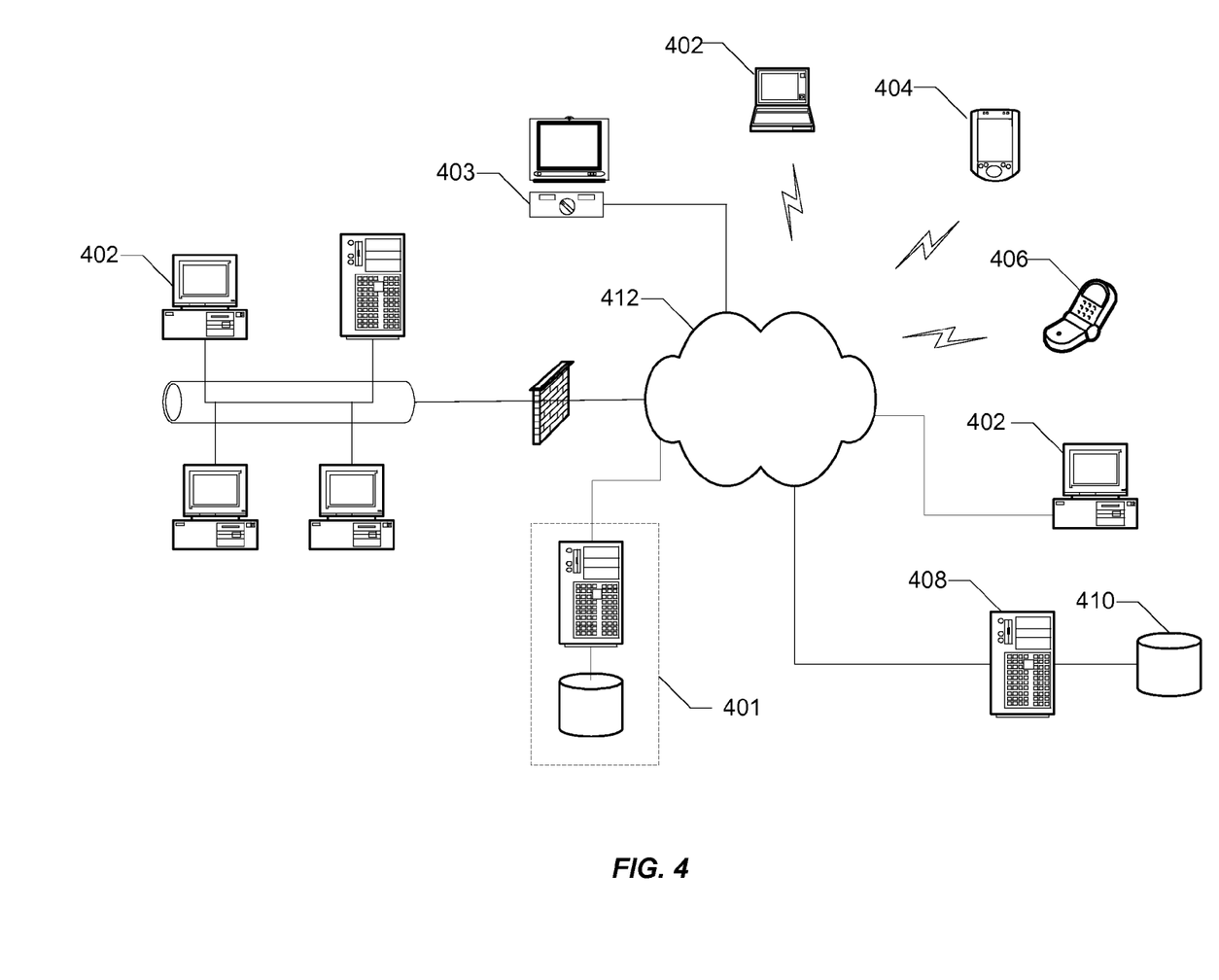
FIG. 4 is a simplified diagram of a computing environment in which embodiments of the invention may be implemented.

Embodiments of the present invention may be employed to measure topical coherence of keyword sets, and to generate clusters of keywords in any of a wide variety of computing contexts. For example, as illustrated in the diagram of FIG. 4, implementations are contemplated in which a population of users interacts with a diverse network environment via any type of computer (e.g., desktop, laptop, tablet, etc.) 402, media computing platforms 403 (e.g., cable and satellite set top boxes and digital video recorders), mobile computing devices (e.g., PDAs) 404, cell phones 406, or any other type of computing or communication platform. The population of users might include, for example, users of online search services such as those provided by Yahoo! Inc. (represented by computing device and associated data store 401), advertisers, providers of advertising services, etc. However, it should again be noted that advertising keywords are only examples of text strings which may be processed according to the invention.

Regardless of the nature of the text strings in a set, or how the text strings are derived or the purposes for which they are employed, they may be processed in accordance with an embodiment of the invention in some centralized manner. This is represented in FIG. 4 by server 408 and data store 410 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

In addition, the computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention may be used to expand or even suggest topically coherent keyword sets to advertisers, e.g., using a very small initial set or description. More generally, the topical coherence of any group of objects (e.g., keyword sets, web pages, documents, etc.) which may be represented by text strings may be determined using the techniques described herein. In addition, this information, as well as information such as the sub-topics identified with an initial data set, may be employed to make improvements and/or suggest alternatives to the various objects represented in the original data set.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method comprising:
    expanding by a processor a text string set including a plurality of text strings using search results generated in response to at least one search query including the plurality of text strings thereby resulting in an expanded text string set;
    identifying frequent itemsets in the expanded text string set;
    developing a vocabulary for the text string set including selected ones of the frequent itemsets;
    calculating a similarity measure for each pair of the selected frequent itemsets in the vocabulary; and
    generating a topical coherence measure for the text string set with reference to the similarity measures, the topical coherence measure representing topical similarity among the plurality of text strings in the text string set.

2. The method of claim 1 wherein expanding the text string set comprises processing the search results to remove low relevance terms.

3. The method of claim 1 wherein identifying frequent itemsets comprises employing a clustering technique on the expanded text string set.

4. The method of claim 1 further comprising iteratively developing the vocabulary for each itemset having a support level above a threshold.

5. The method of claim 1 wherein each frequent itemset corresponds to a cluster of text strings within the text string set, the method further comprising identifying the cluster of text strings for each of the frequent itemsets.

6. The method of claim 5 wherein the text string set comprises advertising keywords for use in sponsored search advertising, the method further comprising initiating an advertising campaign using at least some of the clusters of text strings.

7. The method of claim 5 further comprising identifying a topic descriptor for each cluster of text strings identified, the topic descriptor being derived from the frequent itemset corresponding to the cluster.

8. The method of claim 1 further comprising identifying outlier text strings in conjunction with identification of the frequent itemsets.

9. The method of claim 1 wherein the text string set represents an ad group comprising advertiser keywords and a landing page, and the topical coherence measure represents a quality measure for the ad group, the method further comprising deriving landing page keywords for inclusion in the text string set, the landing page keywords representing a purpose of the landing page.

10. The method of claim 1 wherein the text string set comprises advertising keywords for use in sponsored search advertising.

11. The method of claim 1 wherein the similarity measure for each pair of the selected frequent itemsets comprises a cosine similarity measure.

12. At least one non-transitory computer-readable medium having computer program instructions stored therein, the computer program instructions being configured to enable at least one computing device to perform steps, comprising:
    expand a text string set including a plurality of text strings using search results generated in response to at least one search query including the plurality of text strings thereby resulting in an expanded text string set;
    identify frequent itemsets in the expanded text string set;
    develop a vocabulary for the text string set including selected ones of the frequent itemsets;
    calculate a similarity measure for each pair of the selected frequent itemsets in the vocabulary; and
    generate a topical coherence measure for the text string set with reference to the similarity measures, the topical coherence measure representing topical similarity among the plurality of text strings.

13. The computer program product of claim 12 wherein the computer program instructions are configured to enable the at least one computing device to expand the text string set by processing the search results to remove low relevance terms.

14. The computer program product of claim 12 wherein the computer program instructions are configured to enable the at least one computing device to identify frequent itemsets using a clustering technique on the expanded text string set.

15. The computer program product of claim 12 wherein the computer program instructions are further configured to enable the at least one computing device to iterate developing the vocabulary for each itemset having a support level above a threshold.

16. The computer program product of claim 12 wherein each frequent itemset corresponds to a cluster of text strings within the text string set, and wherein the computer program instructions are configured to enable the at least one computing device to identify the cluster of text strings for each of the frequent itemsets.

17. The computer program product of claim 16 wherein the computer program instructions are further configured to enable the at least one computing device to identify a topic descriptor for each cluster of text strings identified, the topic descriptor being derived from the frequent itemset corresponding to the cluster.

18. The computer program product of claim 12 wherein the computer program instructions are further configured to enable the at least one computing device to identify outlier text strings in conjunction with identification of the frequent itemsets.

19. The computer program product of claim 12 wherein the similarity measure for each pair of the selected frequent itemsets comprises a cosine similarity measure.

20. A computer-implemented method comprising:
- identifying a plurality of sponsored search advertisements in response to a search query from a user, each of the sponsored search advertisements having a keyword set associated therewith;
- ranking by a processor each of the plurality of sponsored search advertisements with reference to a topical coherence measure for the associated keyword set, the topical coherence measure representing a topical similarity among keywords in the keyword set; and
- transmitting the sponsored search advertisements for presentation to the user in accordance with the ranking, of the plurality of sponsored search advertisements with reference to the topical coherence measure.

\* \* \* \* \*